Oct. 11, 1955 W. A. YACK ET AL 2,720,310
EXTRUSION OF METAL
Filed April 3, 1950
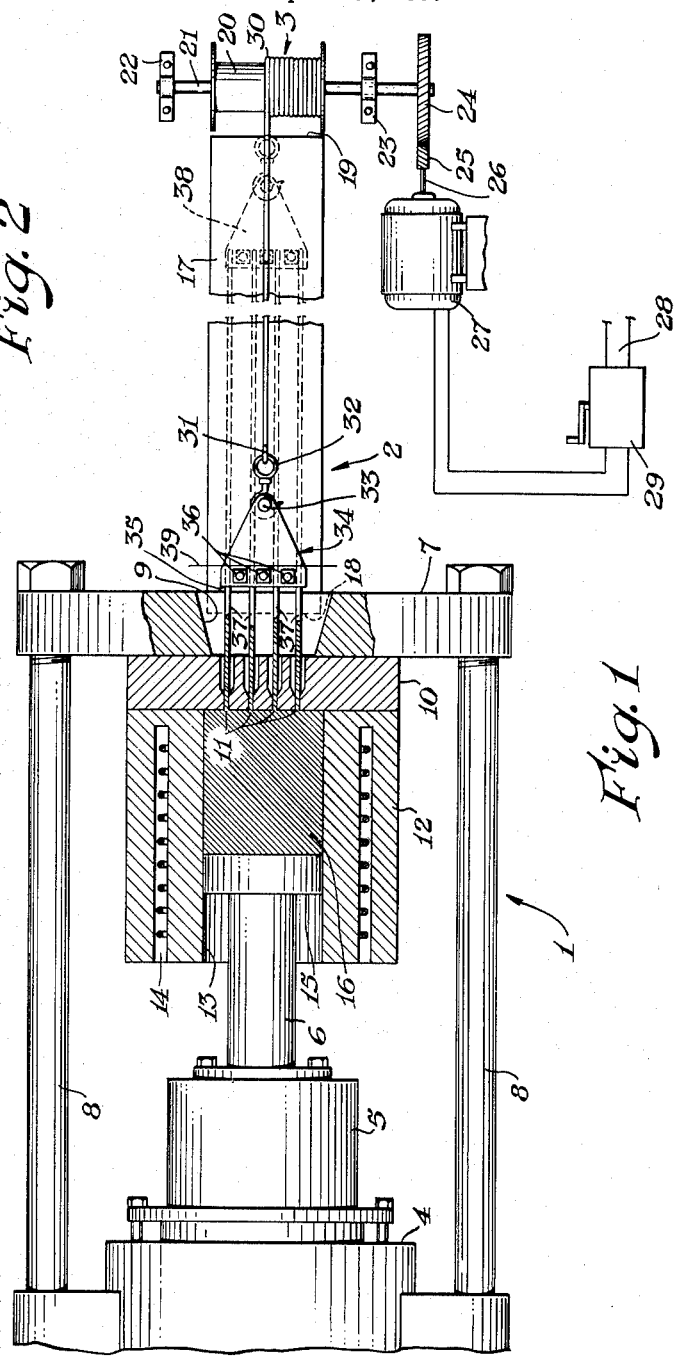
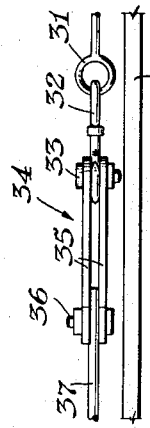
INVENTORS.
Waldo A. Yack
Floyd H. Sczepanski
BY
Griswold & Burdick
ATTORNEYS

United States Patent Office 2,720,310
Patented Oct. 11, 1955

2,720,310

EXTRUSION OF METAL

Waldo A. Yack and Floyd H. Sczepanski, Midland, Mich., assignors to The Dow Chemical Company, Midland, Mich., a corporation of Delaware Application April 3, 1950, Serial No. 153,736

2 Claims. (Cl. 207—10)

The invention relates to methods of extruding or die-expressing metal. It more particularly concerns an improved method of making a plurality of extrusions from a single ingot of a light metal such as aluminum or magnesium, or an extrudable aluminum-base or magnesium-base alloy.

In extruding light metal, the usual procedure is to heat an ingot of the metal to a suitable plastic deformation temperature which depends upon the alloy composition and may be between about 450° F. and 900° F. in the case of magnesium and its alloys and between 500° and 1000° F. in the case of aluminum and its alloys, as known in the art of extruding these metals. The heated ingot is confined in the heated container of an extrusion press and forced through an opening in a die placed at one end of the container by applying pressure on the ingot with a hydraulically actuated ram. The hot extrusion leaving the die is somewhat flabby and is generally supported on a run-out table while the metal extrudes and cools. Extrusions thus made are rarely straight. Because of this, it is the usual practice to apply traction as soon as the extrusion emerges from the die and pull upon the extrusion constantly as it lengthens. The tension used is sufficient to cause the extrusion to become straight as it forms and is less than that causing excessive stretching or significant reduction in cross-sectional area of the extrusion.

A plurality of extrusions is made by using a multi-hole die, each hole having the same cross-sectional area and configuration. Each extrusion is individually pulled, if necessary, as it forms, usually manually with a tension sufficient to keep it straight. However, the extrusions so made either with or without traction are generally of different lengths, the differences in length being as much as 5 to 15 per cent or more in some instances. The amount of difference in length from one extrusion to another from a multi-hole die does not appear to be susceptible of adequate control with conventional extrusion practices, and, because extrusions are generally cut to specified lengths, either the longer extrusions must be cut to shorter lengths or the shorter ones must be scrapped in meeting specifications. In either case, there results a considerable amount of scrapped metal in producing specified lengths of extrusions from a plurality of extrusions made from the same ingot at the same time with a multi-hole die in conventional manner. Another disadvantage of the conventional multi-hole die extrusion procedure is that an excessive number of manipulative steps are involved due to the difference in the length of each extrusion. These steps generally concern measuring the length of each extrusion, and determining where the extrusion is to be cut to required lengths. Either the piece to be cut or the cutting tool must be moved into a different position for each extrusion. In any event, it is desirable, if not necessary, to cut off a short piece of the first portion of the extrusion that emerges from a die opening as well as to cut off the extrusion a short distance beyond the die opening, thereby obtaining an extruded piece between the two cuts that is free from the marks left on the extrusion by the die, where the extrusion ceases movement through the die, and the marks put into the emergent end of the extrusion by the gripping jaws of the pulling device, if one is used.

In view of these disadvantages, the economies of multi-hole die extrusion of the light metals are largely, if not completely, militated against by the requirement of additional manipulative steps and the production of an undesirable amount of scrap.

The principal object of the present invention is to provide an improvement in the multi-hole die-extrusion of the extrudable light metals which makes possible forming a plurality of extrusions at once from the same ingot, all the extrusions having the same length and cross-sectional areas within acceptable tolerance limits without excessive scrap loss. Other objects and advantages of the invention will be apparent as the description proceeds.

The invention is based upon the discovery that by applying traction simultaneously to each extrusion of the light metal as it issues from a multi-hole die from a single ingot of the metal so as to move the emergent end of each extrusion away from the die openings at the same speed, the speeds of extrusion of the metal through each die opening become equalized and equal length straight extrusions are obtained, each having a cross-sectional area conforming to acceptable tolerance limits.

Straight equal length extrusions having the same cross section may be produced according to the invention with conventional extrusion equipment provided with a suitable run-out table to support the extrusions as formed and traction equipment adapted to simultaneously pull all the extrusions away from the die openings together so that each extrusion is the same length at all times during the extrusion. The extrusion conditions, as to metal temperature, ratio of area of cross section of the ingot metal to that of the die openings, extrusion speed, and pressure applied to the ingot to bring about extrusion are generally conventional. Insofar as known, the invention may be applied either to aluminum, magnesium or any of the aluminum-base or magnesium-base alloys which are capable of being extruded.

The following alloys are examples of extrudable aluminum-base alloys: copper 0.25 per cent, silicon 0.6 per cent, magnesium 1.0 per cent, chromium 0.25 per cent, balance aluminum; silicon 0.4 per cent, magnesium 0.7 per cent, balance aluminum; copper 4.5 per cent, manganese 0.6 per cent, magnesium 1.5 per cent, balance aluminum; copper 4.4 per cent, silicon 0.8 per cent, manganese 0.8 per cent, magnesium 0.4 per cent, balance aluminum.

Examples of the extrudable magnesium-base alloys are those containing up to about 10 per cent of aluminum or up to about 3 per cent of zinc, or both aluminum and zinc with or without near saturating amounts of manganese, e. g. from about a maximum of 2 per cent in the absence of aluminum to about 0.1 per cent when the aluminum content is as much as 10 per cent. Examples of other magnesium-base alloys used for extrusions are the magnesium-manganese alloys, containing about 1.5 to 2 per cent of manganese, and the magnesium-zinc-zirconium alloys containing up to about 6 per cent of zinc, and 0.5 per cent of zirconium, the balance being magnesium.

The invention is particularly advantageous in the production of round bars, profile shapes such as angles and T, L, U, H, and Z sections as well as other more complex sections. In making the dies for extruding a plurality of such shapes at once, it is desirable to dispose the die openings symmetrically about the center of the die and to arrange the die so that its center is on the longitudinal axis of the ingot to be extruded.

The invention may be further explained with reference to the accompanying drawing, in which Fig. 1 illustrates diagrammatically in horizontal partly sectional plan a suitable form of apparatus for carrying out the invention; Fig. 2 is a fragmentary side elevation of a portion of the apparatus of Fig. 1. In the two views like numerals designate like parts.

As shown, the apparatus consists of a conventional extrusion press, a run-out table, and a suitable pulling device, indicated generally by numerals 1, 2 and 3, respectively.

The press 1 comprises a hydraulic cylinder 4, one end of which is shown, in which operates the piston 5 carrying the ram 6, and a head 7 tied to the cylinder by tie rods 8. The head 7 is provided with an opening 9 and supports the die 10 which is provided with a cluster or plurality of similar die-openings 11 adjacent to the opening 9. An extrusion cylinder or container 12 abuts the die 10 so that the longitudinal axis of the interior 13 of the container is centrally located with respect to the center of the cluster of die openings 11. The container may be electrically heated as by the resistance heating element 14. A dummy block 15 is usually placed between the ram 6 and the ingot metal 16 to be extruded from the container.

The run-out table 2 comprises a flat platform 17 having a length somewhat longer than the extrusions to be produced. As shown, one end 18 extends into opening 9, the other end 19 extends up to the pulling device 3 so as to provide a support for the extrusions as they form.

The pulling device 3 comprises a drum 20 secured to the shaft 21 carried by the bearings 22 and 23. To one end of the shaft is secured the worm wheel 24 driven by the worm 25 on the shaft 26 of the constant torque motor 27. The motor is connected to a power supply 28 through a conventional power control means 29. A cable 30 is arranged to be wound on and unwound from the drum 20. The free end 31 of the cable carries the hook 32 which engages the pin 33 in a clamp which is indicated generally by numeral 34. The clamp 34 comprises a pair of gripping jaws 35 which may be drawn together by bolts 36 to grip the ends of the extrusions 37.

In operation, the container 12 is heated by the resistance element 14 to a suitable working temperature and while the piston 5 and ram 6 are retracted a heated ingot of the light metal is inserted into the container 12. The dummy block 15 is placed in the container and ram 6 is moved by hydraulic pressure in cylinder 4 into contact with the dummy block to force it into contact with the ingot as shown, sufficient hydraulic pressure then being applied to plastically deform the ingot and cause the ingot metal to extrude from each of the die openings 11, as understood in the art of extruding light metal. Then, in accordance with the method of the invention, as soon as metal extrudes from the die opening a sufficient distance beyond the head 7 producing the beginning 37 of a plurality of extrusions, the ends of these are secured in the jaws 35 of the clamp 34, as shown, and traction is applied to the extrusions through cable 30 by operating the motor 27. Movement of piston 5 is continued so as to extrude metal from the die openings, the amount and rate of application of pressure on the ingot metal thereby being controlled, as understood in this art, so as to avoid excessive extrusion speed. Simultaneously with the application of extrusion pressure by piston 5, sufficient traction is applied to clamp 34 to maintain each extrusion straight as it extrudes and to cause all of them to lengthen to the same extent at the same time. This is accomplished by observing the extrusions as they form and suitably adjusting the torque of the motor 27 by power controller 29 to a value which at least keeps all the extrusions straight and moving together away from the die toward drum 20 along the top of platform 17 and thus causing each extrusion to be the same length during extrusion. In some instances, it may be necessary to increase the torque applied to drum 20 beyond that merely sufficient to move all the extrusions away from the die the same distance in the same time, as when the additional traction is needed to produce straightness in all the extrusions as well as to cause simultaneous extrusion to the same length.

As the metal continues to extrude from each die opening and traction is maintained in accordance with the invention so as to keep all the extrusions the same length as they form, the clamp 34 rides along the top of the platform 17 which also supports the extrusions throughout their length against sagging. When the clamp 34 nears the end 19 of the platform, as indicated in dotted outline 38, the hydraulic pressure on the piston 5 is reduced to stop the extrusion of metal and traction on the clamp 34 is also stopped. The extrusions are cut off near the head 7, e. g. on line 39, and the clamp 34 is released. The rotation of drum 20 is reversed to unwind cable 30 and the released clamp 34 is then manually returned to the press head and attached to the ends of the extrusions left projecting from the die. The extrusion and traction operations are then repeated to form another batch of extrusions, these operations being repeated, if desired, in similar manner until the supply of ingot metal in the container 12 is exhausted.

The following examples are illustrative of the invention:

*Example I*

A magnesium-base alloy nominally containing 1.5 per cent of manganese, the balance being magnesium, in the form of a cast cylindrical ingot about 6 inches in diameter and 18 inches long was heated to about 800° F. in preparation for extrusion with a 1700 ton extrusion press having a container with a cylindrical bore nominally 6 inches in diameter. The container was heated to about 750° F. The press was provided with a two hole die, each hole having the same configuration and area of 0.167 square inch. The heated ingot was inserted into the heated container and extrusion pressure was applied, as in conventional extrusion press operation to cause the ingot metal to extrude from both die openings. In accordance with the invention, as soon as enough metal extruded the clamp of the puller was attached to the ends of the extrusions and traction was applied through the clamp simultaneously to both extrusions with a total tractive effort of 658 pounds which was sufficient to keep each extrusion straight and to cause the extrusions to be the same length at all times during the extrusion, and to extrude at a rate of 20 to 25 feet per minute. Each extrusion so made was straight and 84.5 feet long after cutting off 20 feet from the die openings and removing the initial portion to which the pulling clamp was attached. The cross-sectional area of one of the extrusions was 0.1799 square inch, the other 0.1802 square inch. When similar extrusions were made from another similar ingot using the same press, die, and extrusion conditions, but without using simultaneous traction according to the invention, one of the extrusions was 83 feet long, the other 86 feet long. Their cross-sectional areas were 0.1798 and 0.1791 square inch, respectively.

*Example II*

A magnesium-base alloy having a nominal composition of 3 per cent aluminum, 1 per cent zinc, 0.3 per cent manganese, the balance magnesium in the form of a cylindrical ingot 2.937 inches in diameter and 5.25 inches long was placed in the heated container (3 inch inside diameter) of a 500 ton extrusion press. The press was provided with a two opening die, each die opening forming a ⅜ x ⅜ x 1/16 angle. The ingot was heated to 720° F., and the container to 640° F. The die temperature was 630° F. Extruding pressure was applied at a rate sufficient to extrude ingot metal through both die openings at a rate between about 10 and 15 feet per minute until enough metal extruded to produce about 1 foot of each extrusion. The traction clamp was attached to each extrusion and the extruding operation was continued while traction was applied through the clamp so as to cause both extrusions to lengthen to the same extent at the same time and to keep them straight. This required a tractive effort of 19.5 pounds applied throughout the extruding operation. A pair of extrusions 28.6 inches in length were obtained which were straight and their cross-sectional areas were 0.0459 and 0.0446 square inch, respectively. As a duplicate run, another pair of similar extrusions was made in the same manner with the same die. They were 28.9 feet long and a tractive effort of 24 pounds was required to maintain straightness. Their cross-sectional areas were 0.0460 and 0.0448 square inch, respectively.

In comparison similar extrusions were made of the same ingot metal and with the same press, die, and extruding conditions, but without the simultaneously pulling of the extrusions as they formed. The resulting extrusions were 37 feet and 35 feet 10 inches long, respectively, and their cross sections were 0.0458 and 0.0448 square inch, respectively.

*Example III*

An aluminum-base alloy having a nominal composition of 4.4 per cent copper, 0.8 per cent manganese, 0.8 per cent silicon, 0.4 per cent magnesium, the balance being aluminum in the form of a cylindrical billet 2.397 inches and 5.25 inches long was extruded with the apparatus of Example II using the same two-opening die. The billet was heated to 720° F., the container 670° to 680° F. and the die temperature was about 670° F. The rate of extruding was between about 10 and 15 feet per minute. As soon as the extrusions were long enough to be grasped by the traction clamp, the clamp was attached and both extrusions were kept the same length throughout the extruding operation by pulling on the clamp with sufficient tension to keep both extrusions straight and lengthening at the same rate. This pulling required a tractive effort of about 4.75 pounds. At the end of extrusion, their lengths were 28 feet 11 inches and cross-sectional areas 0.0451 and 0.0439 square inch, respectively. In comparison when similar extrusions were made in similar manner but without using traction according to the invention, their lengths were 35 feet 4 inches and 32 feet 8 inches long, respectively, and their cross-sectional areas were 0.0452 and 0.0442 square inch, respectively.

Among the advantages of the invention are that a plurality of light metal extrusions can be made at once from the same ingot all being of equal length and having the same cross-sectional area within acceptable tolerance limits. A greater output of usable extrusions is obtainable for a given press operating time because all the die openings deliver extrusions at the same speed which may be held at a maximum without hot shorting any one extrusion. There is less extruded metal to be scrapped in producing extrusions of specified length.

We claim:

1. The method of forming simultaneously a plurality of straight extrusions each having substantially the same cross-sectional configuration of a light metal capable of plastic deformation on being heated to a suitable temperature, which comprises heating an ingot of the alloy to a temperature suitable for plastic deformation; laterally confining the heated ingot; applying pressure over one end of the laterally confined ingot sufficient to cause plastic flow of ingot metal from the opposite end while restricting flow therefrom except at a plurality of places thereon each having substantially the same area and configuration so as to produce a plurality of extrusions; applying a pull to each extrusion as it forms; and pulling the beginning end of each extrusion away from the ingot at the same rate while each of the extrusions are forming so that each extrusion has the same length as it forms, said pull being great enough to maintain each extrusion substantially straight.

2. The method of forming simultaneously a plurality of straight extrusions each having substantially the same cross-sectional configuration of a light metal capable of plastic deformation on being heated to a suitable temperature, which comprises heating an ingot of the alloy to a temperature suitable for plastic deformation; laterally confining the heated ingot; applying pressure over one end of the laterally confined ingot sufficient to cause plastic flow of ingot metal from the opposite end while restricting flow therefrom except at a plurality of places thereon each having substantially the same area and configuration so as to produce a plurality of extrusions; applying a pull to each extrusion as it forms; pulling the beginning end of each extrusion away from the ingot at the same rate while each of the extrusions are forming so that each extrusion has the same length as it forms, said pull being great enough to maintain each extrusion substantially straight; and supporting each extrusion at the forward end while being extruded.

References Cited in the file of this patent

UNITED STATES PATENTS

| | | |
|---|---|---|
| 1,849,044 | Summey | Mar. 8, 1932 |
| 1,924,294 | Shirk et al. | Aug. 29, 1933 |
| 2,142,704 | Sparks | Jan. 3, 1939 |
| 2,404,234 | Kerr | July 16, 1946 |